United States Patent
Irvine

[15] 3,637,984
[45] Jan. 25, 1972

[54] TEMPERATURE CONTROL APPARATUS

[72] Inventor: John Anderson Irvine, Penicuik, Midlothian, Scotland

[73] Assignee: Molins Machine Company Limited, London, England

[22] Filed: Nov. 25, 1969

[21] Appl. No.: 879,705

[30] Foreign Application Priority Data

Nov. 27, 1968 Great Britain ............ 56,373/68

[52] U.S. Cl. .................................. 219/471, 219/501
[51] Int. Cl. ................................................ H05b 1/02
[58] Field of Search ............ 219/469, 471, 494, 501, 497

[56] References Cited

UNITED STATES PATENTS 3,356,784  12/1967  Bertioli et al. ............... 219/501 X
3,435,171  3/1969   Lohest ....................... 219/471 X
3,500,019  3/1970   Childress ...................... 219/471

Primary Examiner—Bernard A. Gilheany
Assistant Examiner—F. E. Bell
Attorney—Craig, Antonelli and Hill

[57] ABSTRACT

A rotatable drum has a heating element which is supplied with heating current through sliprings and brushes, a temperature sensor being located in the drum and coupled to an oscillator to modulate the pulse width or frequency of the generated oscillations in accordance with temperature, the modulated oscillations being fed outside the drum through the same sliprings and brushes to a controller to regulate the heating current.

12 Claims, 2 Drawing Figures

TEMPERATURE CONTROL APPARATUS

The present invention relates to apparatus for use in controlling the temperature of a heated rotating body and is concerned particularly, but not exclusively, with apparatus for use in controlling the temperature of a heated rotating drum.

Some processes associated with what is known as flow line production incorporate heated drums into which, or through which, articles pass to be heated. For example, heating may be required to have some effect on the article such as curing or softening, or to seal the article in a container or packet.

As the drum is rotating, electric energy for heating the drum is conducted to a heating element associated with the drum by means of one or more sliprings and brushes. Coarse control of the heating of the drum can be effected by switching the supply of electric energy on and off, for example manually.

When close control of the temperature of the drum is required a temperature sensor is provided in or on the drum and signals from the sensor indicative of the temperature are fed out of the drum to a controller by means of which the supply of electricity to the drum is regulated.

To carry such signals from the sensor to the controller it has been proposed to provide one or more additional sliprings and brushes solely for this purpose. These suffer, however, from the disadvantage that spurious signals (usually referred to as "noise") generated by the action between the sliprings and brushes and variations in the contact resistance between the sliprings and brushes can cause errors in the control effected.

It is an object of the present invention to provide improved apparatus for use in controlling the temperature of a heated rotating body in which the aforesaid disadvantages can be overcome.

According to the present invention apparatus for use in controlling the temperature of a heated rotating body comprises a temperature sensor mounted in or on a rotary body and coupled to an oscillation generator of high frequency and arranged, in operation, to modulate the frequency of the generated oscillations or the width of pulses of the oscillations in dependence upon the temperature of or in the body, and means for transmitting the modulated oscillations to a controller located outside the rotary body and adapted so to regulate the supply of electric current to a heating element associated with the body that regularly recurring pulses of heating current are supplied of a pulse width determined by the modulation of the oscillations, and means are provided for deriving an electricity supply for the oscillator from the pulses of heating current supplied to the heating element. By using a high frequency for the oscillation the capacitance between a slipring and brush for leading the oscillations away from the body can be such as effectively to provide a short circuit or low reactance across the contact resistance whereby changes in the contact resistance are substantially eliminated in their effects upon the transmitted oscillation.

By arranging an amplitude limiter in the circuit outside the rotary body amplitude variations imposed upon the oscillations by the noise can be removed. The invention makes possible the avoidance of the extra sliprings and brushes hitherto proposed for carrying the signals out of the rotating body since it is possible for this purpose to use the same sliprings and brushes as are provided for the heating current. This arises from the fact that the temperature-indicating signals are of high frequency compared with the mains frequency whereby segregation of the temperature-indicating signals from the mains currents is readily effected.

Furthermore by arranging that the heating current is supplied in regularly recurring pulses of a width varying in dependence upon the heat required to maintain a given temperature, it is readily possible to derive from these pulses a supply of direct current for the oscillation generator by a circuit on or in the rotary body. Arrangements in which the heating current is switched on when the body cools below a given temperature and is switched off when the body heats above a given temperature would be unsatisfactory from this point of view. The provision of a battery in or on the body would also be unsatisfactory if the temperature had to be high.

The invention will now be described, by way of example, with reference to the accompanying drawings, in which.

Figure 1:
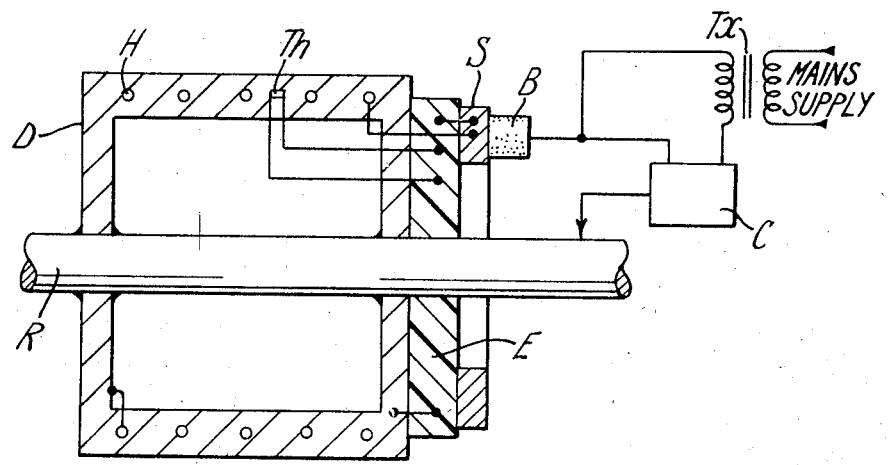
FIG. 1 is a schematic diagram of one embodiment of the invention.

Referring to FIG. 1, a drum D is fixed to a rotary shaft R and has a heating element H embedded in its cylindrical surface. Heating current for the heating element H is provided by a 50-c./sec. mains supply through a transformer $Tx$. One end of the secondary winding of the transformer $Tx$ is connected to a brush B cooperating with a slipring S on the drum D. The slipring S is connected to one end of the heating element H of which the other end is "earthed" to the body of the drum D and hence to the shaft R. The other end of the secondary winding of the transformer $Tx$ is connected through a current controller C to the shaft R and hence to the heating element H.

A thermistor $Th$ is embedded in the cylindrical wall of the drum D and is connected to a unit E which contains an oscillator and modulator, described later, whereby pulses of high-frequency oscillations are generated each pulse of a width dependent upon the temperature sensed by the thermistor $Th$.

These pulses are applied through the slipring S and the brush B to the controller C where they are effective to control the supply of heating current to the heating element in a manner described later.

Figure 2:
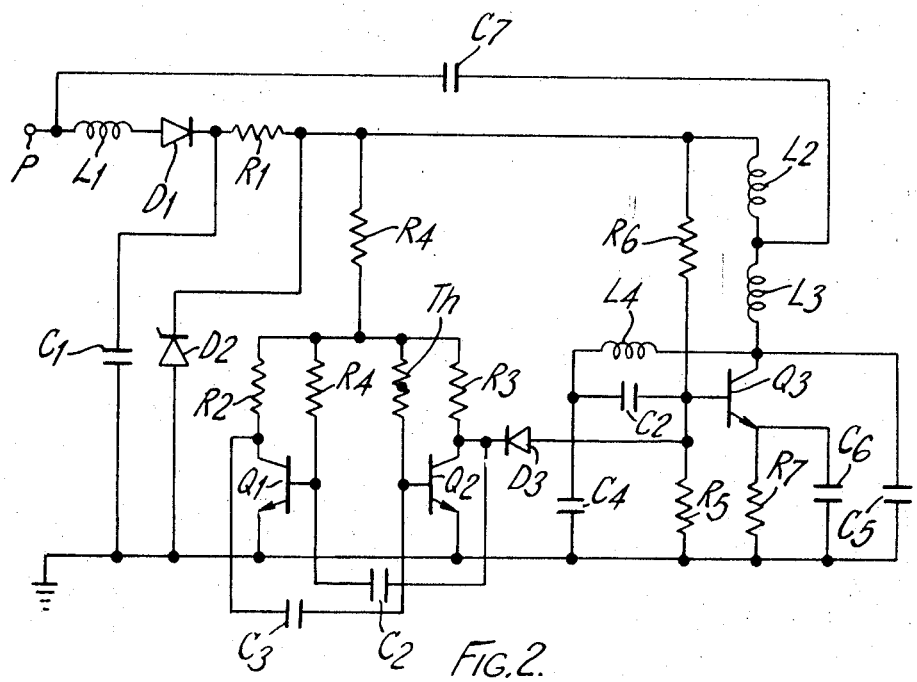
FIG. 2 is a circuit diagram of an oscillator and modulator circuit for use in the embodiment of FIG. 1.

Referring now to FIG. 2, this is a circuit diagram of the unit E with the thermistor $Th$ added. An input and output terminal P is, in the arrangement of FIG. 1 connected to the slipring S from which an AC input is supplied to the unit E and to which the output signal of the unit E is applied.

The terminal P is connected through a high-frequency choke $L_1$ to a diode $D_1$ which in conjunction with a capacitor $C_1$ forms a rectifying system. A resistor $R_1$ and zener diode $D_2$ connected across the capacitor $C_1$ provide a stabilized supply of DC for the unit E.

Transistors $Q_1$ and $Q_2$, resistors $R_2$, $R_3$ and $R_4$, capacitors $C_2$ and $C_3$, and the thermistor $Th$ form a free-running multivibrator of which the output pulses appearing at the collector of $Q_2$ have a width (mark-space ratio) dependent upon the resistance of the thermistor $Th$.

A transistor $Q_3$, resistors $R_5$ and $R_6$, inductors $L_2$, $L_3$ and $L_4$, and capacitors $C_4$ and $C_5$ form a Colpitts oscillator of a frequency of 8 mc./sec., and the output of the multivibrator is coupled to the base of $Q_3$ through a diode $D_3$. The amplitude of the pulses provided by the multivibrator is made such that the oscillator is switched off thereby. Thus, in operation, the oscillator generates bursts of oscillations of high frequency and these are applied to the terminal P through a coupling capacitor $C_7$.

Figure 3:
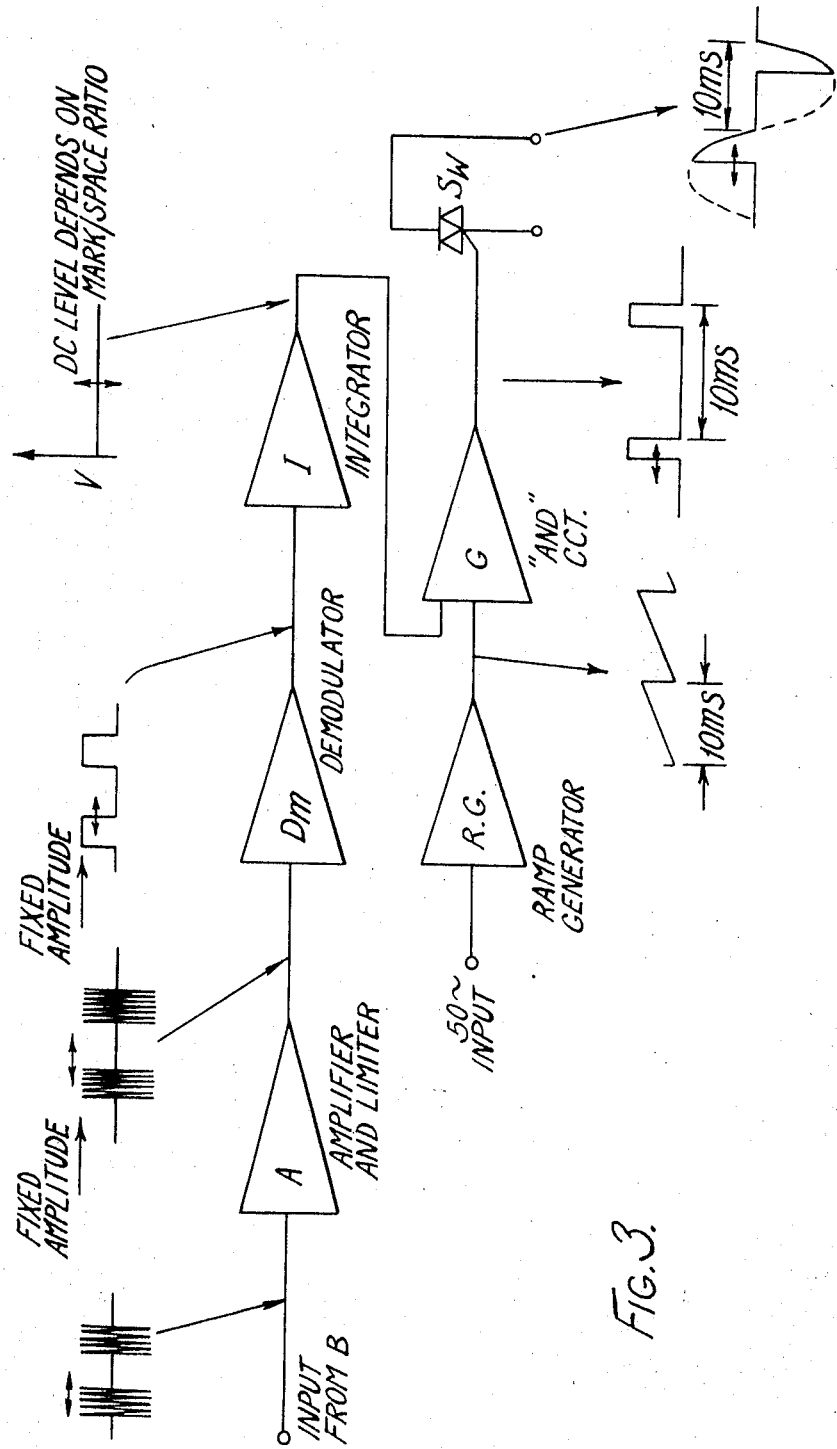
FIG. 3 is a block diagram of a heating-current controller for use in the embodiment of FIG. 1.

Referring now to FIG. 3, this is a block diagram of the controller C of FIG. 1. In FIG. 3 the waveforms of voltages appearing in various parts of the circuit are indicated.

The pulses of oscillation from the brush B (FIG. 1) are applied through an amplifier and amplitude limiter A to a demodulator $Dm$ the output of which consists of pulses as shown of fixed amplitude and a mark-space ratio varying with the temperature of the drum—the higher the temperature the greater the mark-space ratio. These pulses are integrated by an integrator I to provide a direct voltage of a magnitude dependent upon the mark-space ratio. The direct voltage at the output of the integrator I is applied to one input of an "AND gate" or comparator G to the other input of which is applied a 100 c./sec. linear sawtooth voltage provided by a ramp generator RG synchronized by the 50 c./sec. mains supply to provide a ramp every half-cycle of the 50 c./sec. supply. The gate G is arranged to provide an output only when the sawtooth input is equal to or greater than the direct voltage from the integrator I. Thus the output from the gate G consists of one pulse per ramp in the sawtooth voltage and the width of the pulses decreases as the direct voltage input increases, that is as the temperature of the drum increases. These pulses are applied to the trigger electrode of a bidirectional thyristor or TRIAC S*w* connected in series with the AC supply to the heating element H (FIG. 1). As these pulses are synchronized with the mains supply the thyristor S*w* is fired once every half-cycle and it is arranged that it is always fired in each half-cycle by making the maximum value of the direct voltage from the integrator just less than the amplitude of the sawtooth voltage. Thus the heating current consists of pulses each of which is of a duration or width of less than one one-hundredth of a second, the width being dependent upon the temperature of the drum.

Thus regularly recurring pulses of heating current are applied to the heating element H and to the terminal P whereby a constant supply of DC can be provided for the oscillator, the modulator and the thermistor.

Although an embodiment has been described in which the mark-space ratio of the pulses of high-frequency oscillations is modulated in dependence upon temperature it will be appreciated that frequency modulation of a continuous oscillation could alternatively be used. The demodulator would then be in the form of a discriminator providing the direct voltage applied to the gate G.

I claim:

1. Apparatus for use in controlling the temperature of a heated rotating body comprising a high-frequency oscillation generator, a heating element and a temperature sensor all carried by a rotary body, said temperature sensor being coupled to said oscillation generator so as to modulate the width of pulses of the generated oscillations in dependence upon the temperature of the body, a source of electric current, control means for regulating the supply of electric current from said source to said heating element to provide regularly recurring pulses of heating current having a pulse width determined by the modulation of said oscillations, common means for transmitting the oscillations to said control means and said heating current pulses to said heating element, and means for supplying to said oscillation generator an electricity supply derived from the pulses of heating current supplied to the heating element.

2. Apparatus as claimed in claim 1 in which the said means for transmitting the modulated oscillations to the said controller comprises a slipring and brush which are also used to supply the said electric current to the said heating element.

3. Apparatus as claimed in claim 2 in which an amplitude limiter is incorporated in an electrical circuit outside the rotary body to remove amplitude variations imposed upon the oscillations by noise.

4. Apparatus as claimed in claim 1 in which the temperature sensor comprises a thermistor embedded in the cylindrical wall of the drum.

5. Apparatus as claimed in claim 4 in which the thermistor is connected to the oscillation generator which includes an oscillator and a modulator whereby bursts of high-frequency oscillations are generated, each burst being of a width dependent upon the temperature sensed by the thermistor.

6. Apparatus as claimed in claim 5 in which the thermistor is incorporated in a multivibrator circuit constituting the modulator so that output pulses of the multivibrator circuit have a mark-space ratio dependent upon the resistance of the thermistor and thus dependent upon the temperature of the drum.

7. Apparatus as claimed in claim 6 in which the output of the multivibrator is connected to the oscillator in a way such that the pulses provided by the multivibrator operate to switch off the oscillator so that in operation the oscillator generates bursts of oscillations of high frequency for controlling the heating current supplied to the heating element.

8. Apparatus as claimed in claim 7 in which the said oscillator comprises a Colpitts oscillator.

9. Apparatus as claimed in claim 7 in which the output of the said oscillator is connected to a controller which is operative to control the current supplied to the heating element.

10. Apparatus as claimed in claim 9 in which the controller includes a comparator into which is fed both a direct voltage derived from the output of said oscillator by demodulation and integration and also a mains voltage, the comparator being arranged to provide an output only when the mains voltage is equal to or greater than said direct voltage.

11. Apparatus as claimed in claim 10 in which the mains voltage is provided by a ramp generator so that the output from the comparator consists of one pulse per ramp in the sawtooth voltage and the width of the pulses decreases as the direct voltage input increases, that is as the temperature of the heated rotating body increases.

12. Apparatus as claimed in claim 11 in which the output from the comparator is applied to the trigger electrode of a bidirectional thyristor connected in series between an AC supply and the heating element.

* * * * *